United States Patent
Burns et al.

(10) Patent No.: US 8,087,108 B2
(45) Date of Patent: Jan. 3, 2012

(54) SINK PROTECTOR

(75) Inventors: Joy Burns, Redondo Beach, CA (US);
Sarah Rosenbach, Oakland, CA (US);
Randall Lewis, Simi Valley, CA (US);
Brad Cracchiola, Agoura Hills, CA (US)

(73) Assignee: Rubbermaid Incorporated, Huntersville, NC (US)

( * ) Notice: Subject to any disclaimer, the term of this patent is extended or adjusted under 35 U.S.C. 154(b) by 918 days.

(21) Appl. No.: 11/753,738

(22) Filed: May 25, 2007

(65) Prior Publication Data

US 2008/0263762 A1  Oct. 30, 2008

Related U.S. Application Data

(60) Provisional application No. 60/808,418, filed on May 25, 2006.

(51) Int. Cl.
*A47J 47/20* (2006.01)
*A47L 19/04* (2006.01)

(52) U.S. Cl. .............. 4/657; 4/656; 211/41.3; 211/41.4; 211/41.5; 211/41.6

(58) Field of Classification Search .............. 4/638, 654, 4/656, 657; 211/41.3–41.6; 34/238; D32/55, D32/58
See application file for complete search history.

(56) References Cited

U.S. PATENT DOCUMENTS

| | | | |
|---|---|---|---|
| 477,137 A * | 6/1892 | Mesick | .............................. 4/631 |
| 653,714 A | 7/1900 | Thurman | |
| 784,944 A | 3/1905 | Jaquith | |
| 916,283 A | 3/1909 | Eccleston | |
| 1,373,975 A | 4/1921 | Riddle | |
| 1,533,891 A | 4/1925 | Oles | |
| 1,774,278 A | 8/1930 | Kukulski | |
| 1,908,128 A | 5/1933 | De Bie | |
| D253,685 S | 12/1979 | Chapman | |
| D258,191 S | 2/1981 | Berman et al. | |
| D306,926 S | 3/1990 | Heller et al. | |
| D326,750 S | 6/1992 | Druzek | |
| 5,295,589 A | 3/1994 | Riepl | |
| D347,718 S | 6/1994 | Vraft et al. | |
| D348,131 S | 6/1994 | Bozzo et al. | |
| D363,577 S | 10/1995 | Brightbill et al. | |
| D369,888 S | 5/1996 | Demaray | |
| D388,278 S | 12/1997 | Howitt | |
| D398,725 S | 9/1998 | Merkel | |
| D418,646 S | 1/2000 | Hampshire | |
| D418,647 S | 1/2000 | Snell | |
| 6,453,488 B1 | 9/2002 | Shamroth | |
| D507,702 S | 7/2005 | Compagnucci | |
| D514,765 S | 2/2006 | Dretzka | |

* cited by examiner

*Primary Examiner* — Darren W Gorman

(74) *Attorney, Agent, or Firm* — Lempia Summerfield Katz LLC

(57) ABSTRACT

A sink protector is provided that includes a frame defining a frame opening, and a grate supported by the frame. The grate includes a first grate section and a second grate section, each having a perimeter and a plurality of wires extending across each grate section to provide structure for supporting various items to be deposited in a sink. The grate is sufficiently porous to allow the unobstructed passage of water and food particles therethrough. The grate sections are pivotally connected such that at least one of the grate sections pivots about the other grate section to allow unencumbered access to the sink drain.

14 Claims, 5 Drawing Sheets

SINK PROTECTOR

RELATED APPLICATION DATA

This patent application claims priority benefit of U.S. Provisional Application Ser. No. 60/808,418, which was filed on May 25, 2006, the disclosure of which is hereby incorporated by reference as if set forth in its entirety herein.

BACKGROUND OF THE INVENTION

1. Field of the Disclosure

The present disclosure is generally directed to sink protectors, and more particularly to a sink protector that permits access to a sink drain without removing the sink protector from the sink.

2. Description of Related Art

Sink surfaces are typically made from enamel covered porcelain, stainless steel, or other more recent materials. Over extended periods of time, repeated use of the sink in combination with contact between the sink and various items deposited in or around the sink can cause the surfaces of the sink to become warn, damaged, and otherwise scarred or marred.

Sink protection devices have become prevalent as a way of protecting the sink during use. Sink protectors are placed within the sink on the bottom sink surface to protect the surface by minimizing or eliminating contact against the bottom surface. Conventional sink protectors are typically formed from a mat made of rubber or similar material that is placed on the bottom sink surface. The mats generally have apertures extending through that permit water to flow through the protector.

Unfortunately, in order to ensure that typical sink protectors provide adequate protection to the sink surface, they typically have only a few holes to permit water to flow through to the drain, and further do not provide access to the sink drain without removal of the mat. As a result, any food that is dropped into the sink while the protector is in place typically cannot pass through the holes, and thus cannot reach the sink drain. Furthermore, it is common that the holes become clogged with food particles, thereby further reducing the porosity of the sink protector and leading to water back ups.

Because most sinks are equipped with garbage disposal units connected to the drain, it is common to run the food into the drain for disposal. Some protectors provide a relatively small aperture extending through in alignment with the sink drain, however such apertures are not usually sufficiently large to permit access to the entire sink drain diameter. Accordingly, food waste typically cannot pass down through the protector to the drain without first having to remove the sink protector.

What is therefore needed is a sink protector that adequately shields the sink surface from damage, that is sufficiently porous to allow water to easily flow through, and that provides adequate access to the sink drain.

SUMMARY

In accordance with one aspect of the present invention, a sink protector is provided that includes a frame defining a frame opening, and a grate supported by the frame. The grate includes a first grate section and a second grate section. Each grate section includes a plurality of grate members defining apertures extending therethrough. The grate sections are pivotally connected such that at least one of the grate sections pivots about the other grate section.

It should be appreciated that the foregoing and other aspects of the invention will appear from the following description. In the description, reference is made to the accompanying drawings which form a part thereof and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Objects, features, and advantages of the present invention will become apparent upon reading the following description in conjunction with the drawing figures, in which like reference numerals are intended to correspond to like elements throughout, and in which.

DETAILED DESCRIPTION OF THE DISCLOSURE

A disclosed sink protector constructed in accordance with one aspect of the invention solves or improves upon one or more of the above-noted problems and/or disadvantages in the prior art. The sink protector has a frame supporting a screen or grate that rests on the frame. The sink protector can be placed inside a sink and can rest on the lower sink surface and cover the sink drain. The grate can be sufficiently porous to allow a food particles of greater size and number to reach the drain without clogging the sink protector with respect to the prior art. Furthermore, a section of the grate that covers the sink drain can be pivoted from a closed position to an open folded position that provides easy access to the drain. As a result, the disclosed sink protector can remain on the bottom of the sink and yet provide unencumbered access to the drain of the sink without completely removing the sink protector from the sink. A part of the sink protector also remains usable even while permitting access to the drain, if desired.

Figure 1:
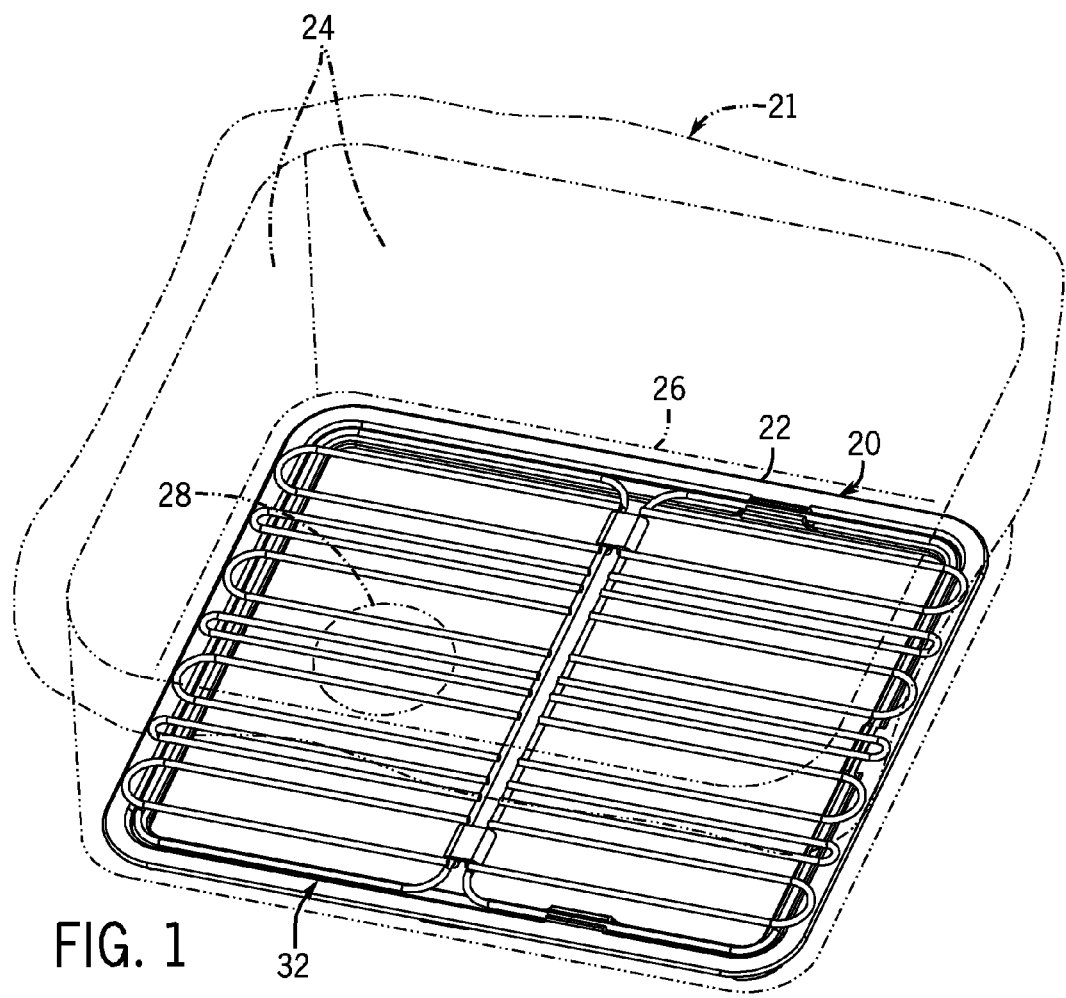
FIG. 1 is a perspective view of a sink protector installed in a sink in accordance with one aspect of the present invention, wherein the sink protector is in a fully closed position.
Figure 2:
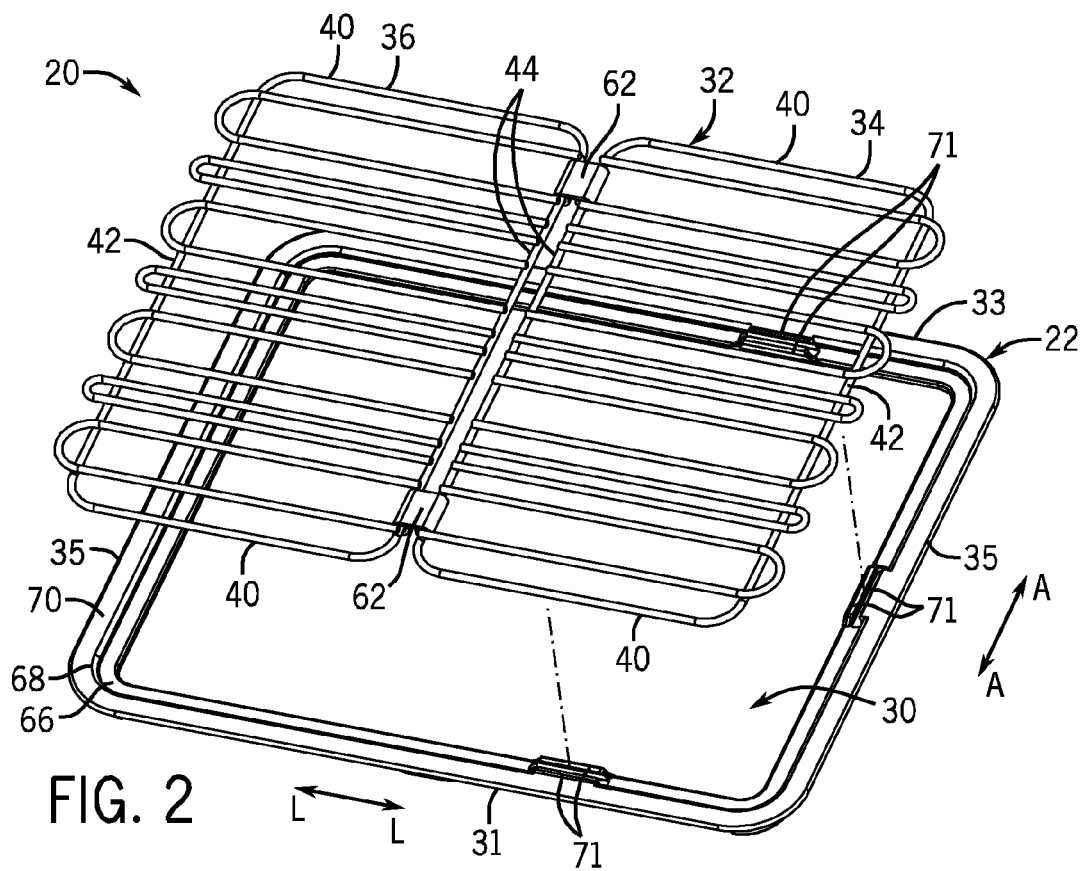
FIG. 2 is an exploded perspective view of the sink protector illustrated in FIG. 1.

Referring to FIGS. 1 and 2, a sink protector 20 constructed in accordance with one aspect of the present invention is illustrated installed in a sink 21. The sink 21 is defined by a plurality of side walls 24, a bottom surface 26, and a conventional sink drain 28 formed in the bottom surface. The sink protector 20 includes a substantially rectangular outer frame 22 that defines a frame opening 30. The frame 22 defines the outer perimeter of the sink protector 20, and extends in an elongate longitudinal direction L-L and a lateral direction A-A extending perpendicular to the longitudinal direction L-L. The frame 22 is an open structure that defines a pair of opposing elongate longitudinally extending edges 33 integrally connected to a pair of laterally extending edges 35. The intersections between edges 33 and 35 are rounded. In one example, the frame 22 can be an injection molded component and can be fabricated from any suitable plastic, thermoplastic, or other suitable material. In one example, the material can have some resiliency or flexibility and is constructed from material that will not scratch or mar a surface of the sink.

Figure 4:
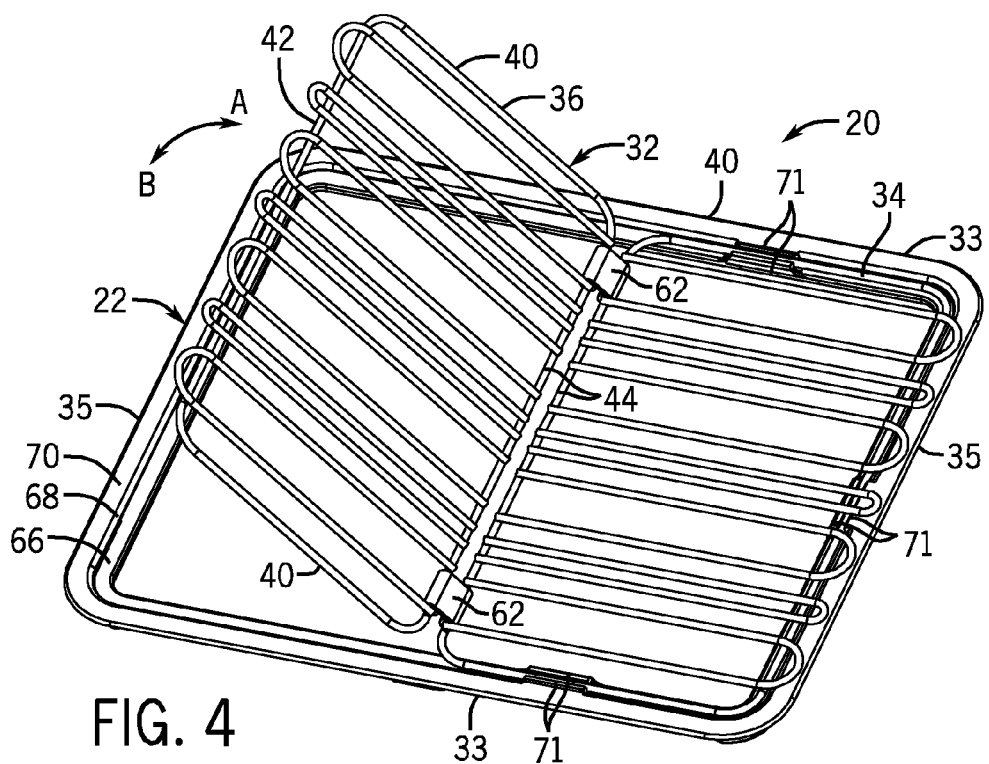
FIG. 4 is a perspective view of the sink protector illustrated in FIG. 2 in a partially open position.
Figure 5:
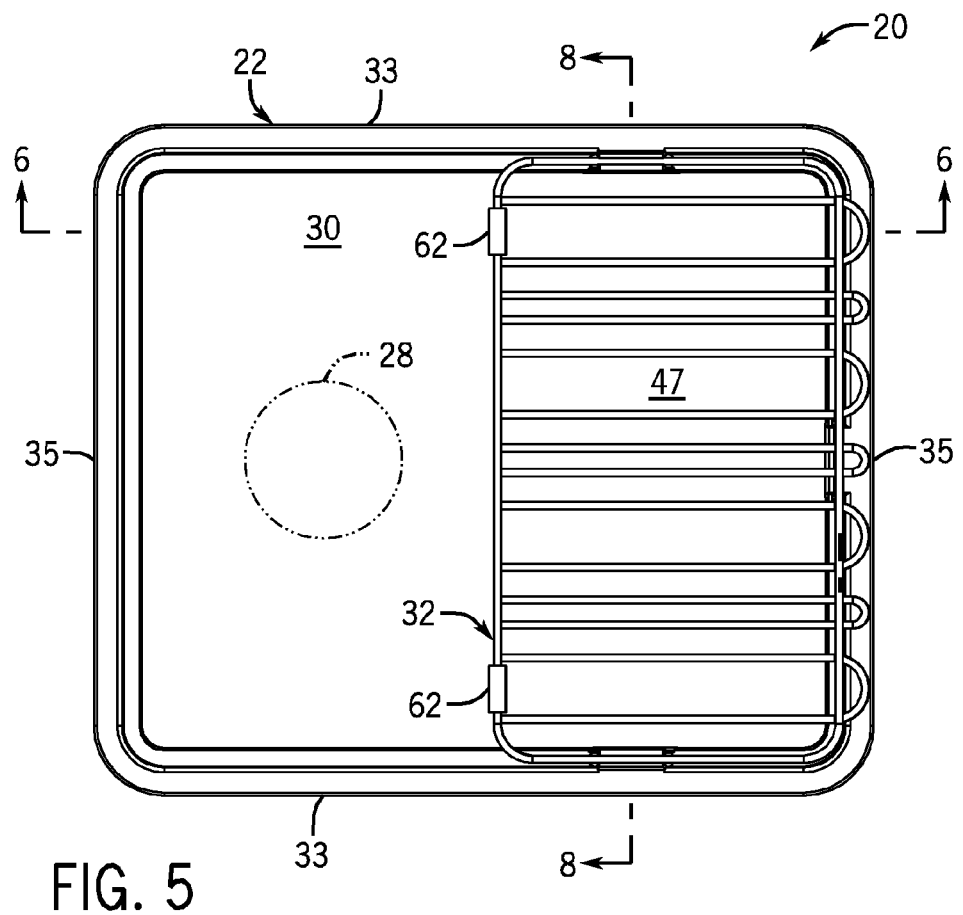
FIG. 5 is a top plan view of the sink protector illustrated in FIG. 4 but in a fully open position.

The sink protector 20 further includes a grate 32 that is carried by the frame 22 and extends across the frame opening 30. In the disclosed example the grate 32 is configured as a bent wire, welded structure having two laterally spaced grate sections 34 and 36. In other examples, the grate can be formed from molded plastic, rubber, or other materials if desired. As illustrated, the grate section 36 is in alignment with the sink drain 28. The first grate section 34 is illustrated as being attached to the frame 22, while the second grate section 36 rests on the frame and can pivot relative to the first grate section 34 to expose that portion of the frame opening 30 that is in alignment with the sink drain 28, as illustrated in FIGS. 4 and 5.

Figure 3:
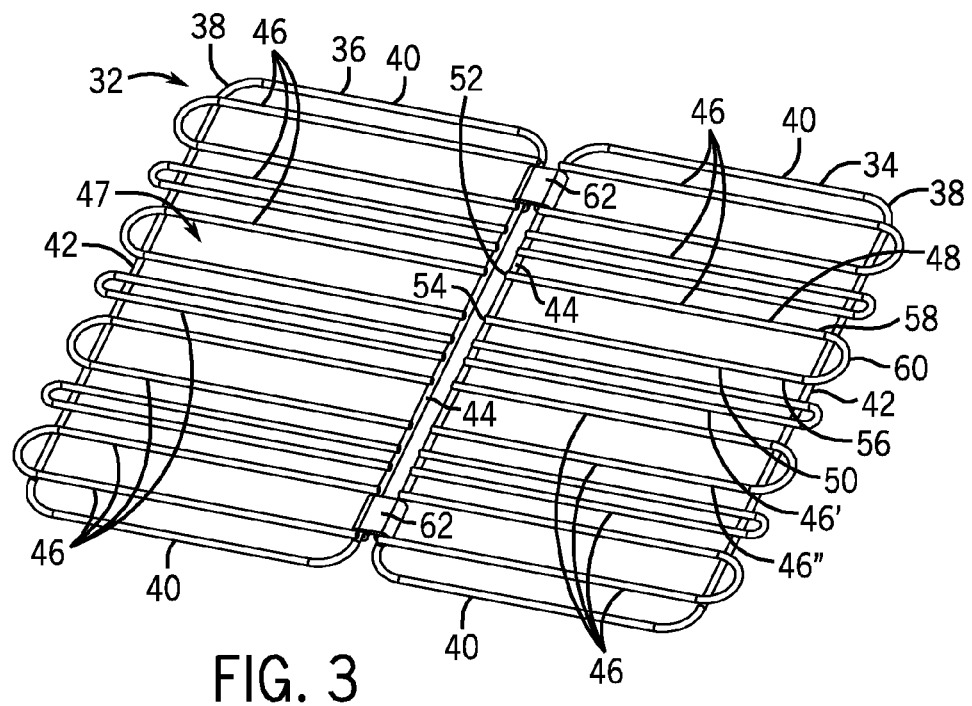
FIG. 3 is a perspective view of a grate forming part of the sink protector illustrated in FIG. 2.

The grate 32 will now be described with further reference to FIG. 3. As illustrated, each section 34 and 36 comprises a half-section of the grate 32 and is constructed symmetrical with the other section. Accordingly, the construction of only section 34 is described in detail herein, it being appreciated that the description of section 34 likewise applies to section 36, which similarly constructed and configured. Grate section 34 includes a grate frame 38 formed from a bent perimeter wire assuming a substantially rectangular configuration. The grate frame 38 defines the perimeter of the grate section 34.

The grate frame 38 defines a pair of opposing longitudinally extending edges 40, an outer laterally extending edge 42, and an opposing inner laterally extending edge 44. The longitudinally extending edges 40 define the lateral boundary of the grate section 34, and are in alignment with the longitudinally extending edges 33 of the outer frame 22. The outer laterally extending edge 42 defines the longitudinal boundary of the grate section 34, and is in alignment with one of the laterally extending edges 35 outer frame 22, while the inner laterally extending edge 44 extends across the frame opening 30 between the longitudinally extending edges 33 of the outer frame 22. The edges 40 and 42 of the grate frames 38 of grate sections 34 and 36 thus define the perimeter of the grate 32. The grate frame 38 has rounded corners matching the rounded corners of the outer frame 22 so that the grate section 34 registers with the outer frame 22, as is described in more detail below.

The grate section 34 further includes a plurality of grate members in the form of parallel traversing wires 46 extending longitudinally between opposing laterally extending edges 42 and 44. The grate wires 46 can be formed from a bent steel, and encapsulated by a material (e.g., rubber, plastic, or the like) that is softer and less abrasive than the underlying wire material. Each wire 46 defines a pair of parallel longitudinally extending wire segments 48 and 50, each having longitudinal inner ends 52 and 54, respectively. Each wire segment 48 and 50 can be welded or otherwise attached to the inner laterally extending edge 44 of the grate frame 38. Each segment 48 and 50 extends longitudinally outward from the inner ends 52 and 54 and define longitudinal outer ends 56 and 58, respectively, that terminate slightly longitudinally outward from the outer ally extending edge 42 of the grate frame 38. The outer ends of each segment 48 and 50 can be integrally joined by a unshaped middle portion 60 that is disposed longitudinally outboard of the outer edge 42. One or more of the segments 48 and 50 can be welded or otherwise attached to the upper surface of the outer edge 42 at a location longitudinally inboard of the middle portion 60.

It should be appreciated that the unshaped middle portions 60 can define any desired radius, and that the radius correspondingly defines the lateral distance between the wire segments 48 and 50 of a given wire 46. As illustrated, the middle portions 60 of adjacent traversing wires 46 alternate between a smaller radius and a larger radius, thus producing a first plurality of wires 46' having a small lateral distance between the corresponding wire segments 48 and 50, and a second plurality of wires 46" interposed between wires 46' and defining a larger lateral distance between the corresponding wire segments 48 and 50. The laterally central wire 46 is of the first plurality 46' of wires, and is flanked on both lateral sides by wires 46 of the second plurality of wires 46" which, in turn, are flanked by laterally outboard wires 46 of the first plurality of wires 46' which, in turn, are flanked by laterally outboard wires of the second plurality of wires 46".

The traversing wires 46 thus define a grate-like structure that forms the surface of the sink protector 20 on which pots, pans, and dishes can rest when in use. Furthermore, the grate 32 is also a relatively open structure as illustrated, defining a plurality of apertures 47 extending through the grate between the wires 46. Because the wires 46 occupy relatively little surface area across the opening 30 (less than half the surface area of the opening 30 as illustrated), food, including large sized pieces, and water are therefore allowed to pass easily through the grate 32 to the sink drain 28 without having to open the frame. The sink protector 20 is thus constructed to be sturdy and strong so as to support dishes, pot, and pans well above the sink surface and yet provide these drain access features during use. Of course, the configuration of the grate 32 and pattern of the grate-like structure can change considerably without departing from the spirit and scope of the present invention.

Figure 6:
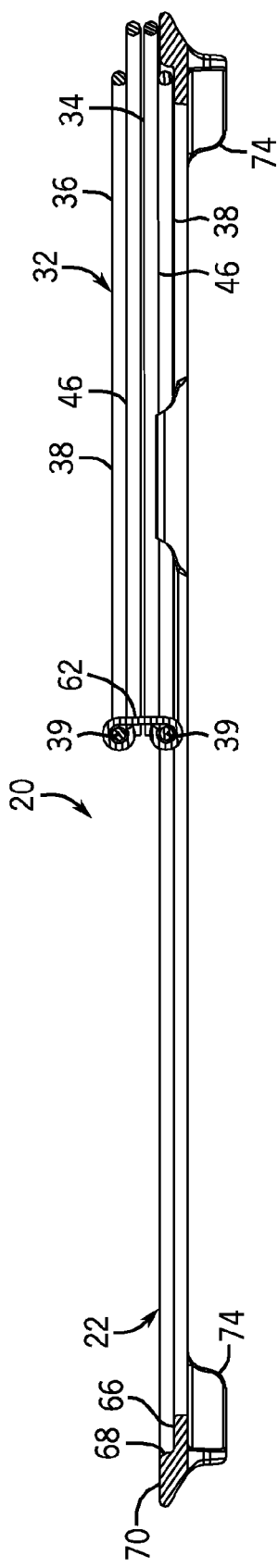
FIG. 6 is a sectional side elevation view of the sink protector taken along line 6-6 of FIG. 5.
Figure 7:
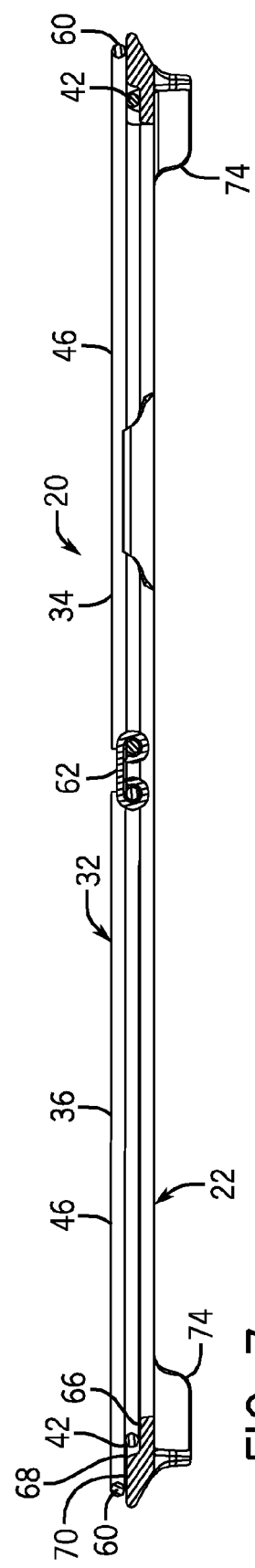
FIG. 7 is a sectional side elevation view of the sink protector similar to that of FIG. 6, but illustrating the sink protector in a fully closed position.

Referring now to FIGS. 4-6, the two grate sections 34 and 36 are pivotally connected. In particular, a pair of laterally spaced hinges 62 connecting the inner laterally extending edges 44 of the grate frames 38. Each hinge 62 defines a flat metal plate bent around the edges 44 of the grate frames 38 to form an aperture 39 that rotatably receives the edges 44 of the grate sections 34 and 36. As will be evident to those having ordinary skill in the art, other connection methods and mechanisms can be utilized that can permit a screen or grate to have two sections which can pivot relative to one another.

During operation, the pivotable grate section 36 can be disposed in a closed position whereby the grate section 36 rests on the outer frame 22 and prevents unencumbered access through the frame opening 30. In the closed position, the two sections 34 and 36 of the grate 32 are connected to one another and supported by the frame 22 so that they lie in a substantially flat planar configuration. The grate section 36 can be manually pivoted in the direction of Arrow A from the closed position illustrated to a folded, or open, position whereby the grate section 36 rests flat against the grate section 34, thereby exposing that portion of the opening 30 defined by one of the longitudinally extending edges 33, the integrally connected pair of laterally extending edges 35, and the inner laterally extending edge 44 of the grate section 36.

A user is advantageously provided with unencumbered access to the sink drain 28 when the grate section 36 is in the open position. At the same time, the grate section 36, which is disposed on top of grate section 34, can be used to support pots, pans, and dishes, and the like while permitting the relatively unencumbered flow of water through the grate sections 34 and 36. When the grate section 36 is disposed on top of the grate section 34, the grate frames 38 and wires 46 are in vertical alignment, and the size of the apertures 47 extending through the grate 32 is not reduced. The grate section 36 can subsequently be pivoted about the direction of Arrow B from the open position to the closed position.

While two grate sections 34 and 36 are illustrated as being pivotally connected, it should be appreciated that the grate 32 could be alternatively formed from three or more sections, at least one of which being pivotally connected to another between an open position and a closed position as described above to allow unencumbered access through the grate 32 (e.g., to the sink drain 28). Additionally, while the grate 32 includes the two grate sections 34 and 36 of equal size and shape, it should be appreciated that the pivotable grate section 36 can define a longitudinal distance that is equal to or less than that of the remainder of the grate 32 such that the grate section 36 can rest on the remainder of the grate 32 when in the open position. Furthermore, while the pivot axis extends in the lateral direction A-A, one having ordinary skill in the art will appreciate that the pivot axis could alternatively extend in the longitudinal direction L-L or any other direction that allows one of the grate sections to be pivoted to an open position whereby access through the grate (e.g., to the sink drain 28) is unencumbered.

It should be appreciated that while both grate sections 34 and 36 are pivotable about the other, grate section 34 is fixed to the outer frame 22, thus causing the grate section 34 to remain stationary while the opposing grate section 36 is pivotable. The connection of the grate 32 to the frame 22 will now be described with respect to FIGS. 2 and 8.

Specifically, as illustrated in FIGS. 2 and 5, the frame 22 includes a horizontally flat rectangular seat 66 and a vertical lip 68 projecting upward from the outboard edge of the seat 66. The lip 68 has a height less than the diameter of the outer edges 42 of the grate 32 such that the u-shaped middle portions 60 of the wires 46 clear the upper end of the lip 68. The grate 32 is sized such that the longitudinally extending edges 40 and outer laterally extending edges 42 rest on the seat 66 and are disposed inboard with respect to the vertical lip 68. The edges 42 can abut the lip 68, or can be slightly spaced from the lip 68. A horizontal flange 70 projects outward from the upper end of the vertical lip 68, and is disposed beneath the middle portions 60 of the wires 46. The flange 70 projects out form the vertical lip 68 a distance greater than the distance that the u-shaped middle portions unshaped middle portions 60 extend out from the outer edges 42 of the grate 32. Accordingly, when the sink protector 20 is installed in the sink 21, the flange 70 protects the sink surfaces from being brought into contact with the wires 46.

Figure 8:
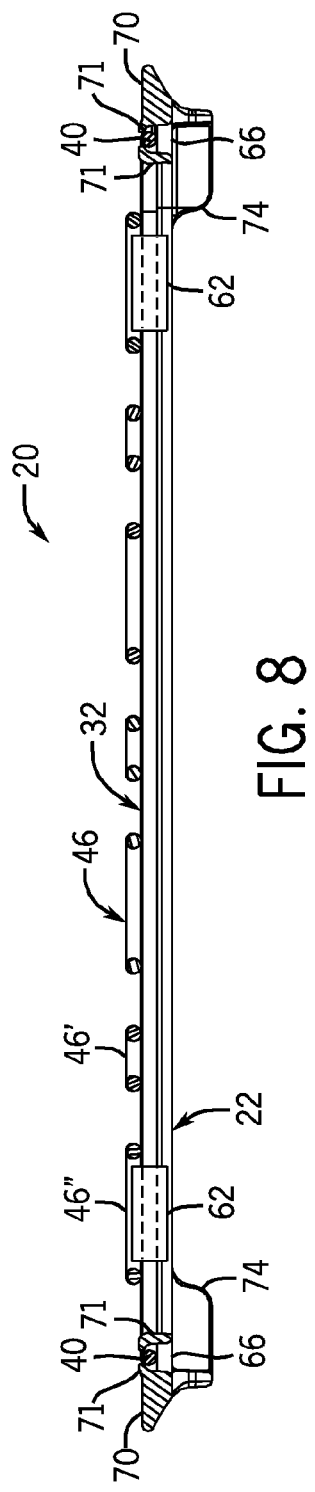
FIG. 8 is a sectional side elevation view of the sink protector taken along line 8-8 of FIG. 5.

Referring now to FIGS. 2 and 8, the frame 22 includes a plurality of projection members 71 extending horizontally along a portion of the seat, and projecting upward from the seat 66. The projection members 71 are provided in pairs such that a gap is disposed between each pair of projection members 71 that is aligned with the longitudinally extending edges 40 and outer laterally extending edge 42 of the grate section 34, respectively, to define a receptacle for the grate section 34.

Specifically, the edges 40 and 42 of grate section 34 are sized to snap between the projection members 71, which can have a curved profile such that the upper ends of the projection members define a distance therebetween that is less than the diameter of the edges 40 and 42 to ensure that the grate section 34 is sufficiently attached to the frame 22. The projection members 71 can be formed from any plastic or alternative suitable material such that they possess the requisite strength to retain the grate section 34 during operation, and the flexibility to allow the grate section to be removed upon the application of a sufficient upward force to the edges 40 and 42 that causes the projection members 71 to momentarily flex as the edges 40 and 42 snap out of engagement with the members 71.

The projection members 71 are positioned to attach the grate section 34 to the frame 22, while the grate section 36 simply rests on the frame seat 66. Accordingly, while the grate 32 permits either grate section to pivot about the other, the attachment of grate section 34 to the frame only permits grate section 36 to pivot about a laterally extending pivot axis with respect to grate section 34. Because the sink protector 20 is symmetrical, the frame 22 can be installed in the sink in any desired orientation such that the grate section 36 can be disposed on the left-hand side of grate section 34 as illustrated, or rotated 180° such that the grate section 36 is disposed on the right-hand side of grate section 34. The sink protector 20 can thus be advantageously positioned in the sink 21 with the pivotally connected grate section disposed over the sink drain 28. A user can then freely access the sink drain 28 simply by pivoting the associated grate section out of the way.

Figure 9:
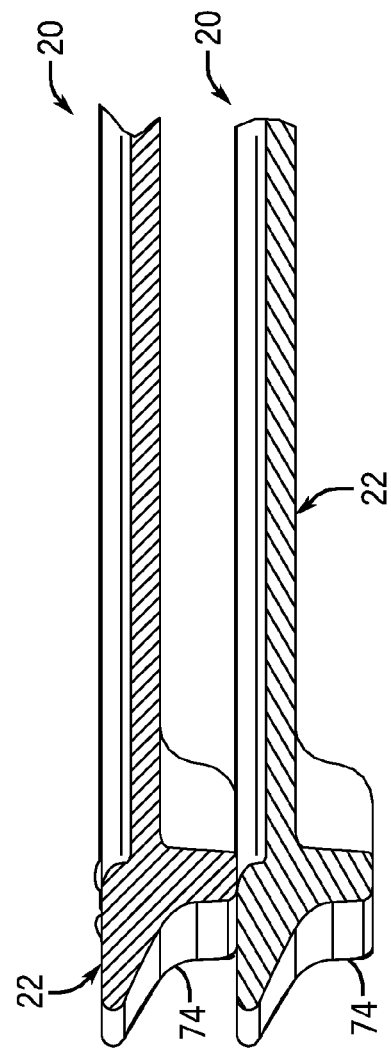
FIG. 9 is a sectional side elevation view of a portion of a pair of stacked sink protectors of the type illustrated in FIG. 1.

Referring now to FIGS. 8 and 9, the sink protector 20 is advantageously configured to stack vertically on top of other like sink protectors, for the purposes of shipping, commercial storage, retail display, and the like. Specifically, the sink protector 20 includes a plurality of feet 74 projecting down from the frame 22, and in particular from the horizontal flange 70. Each foot 74 can be disposed at a corner of the frame, at the intersection between the longitudinally extending edges 33 and the laterally extending edges 35, and can be curved to correspond generally to the profile of the frame 22. The feet 74 are out of alignment with wires 46, and thus are positioned to rest on top of each other as a plurality of sink protectors 20 are vertically stacked. Specifically, when the sink protectors 20 are stacked, the bottom of the feet 74 rest on the frame 22 of the sink protector below, in vertical alignment with the feet 74 of the sink protector below. Because the stacked sink protectors 20 can register with each other, the stack height is less than the cumulative height of the individual sink protectors 20 that are stacked. Specifically, the height of the wires 46 do not add to the height of the stacked sink protectors 20.

It will be evident to those having ordinary skill in the art that an exemplary sink protector has been described and illustrated, and the overall size, shape, and geometric configurations of the sink protector 20 and its associated components can vary considerably from that disclosed herein and yet fall within the spirit and scope of the present invention. For instance, a generally rectangular configuration is disclosed, but the shape and contour of the components can vary considerably to accommodate different sized and shape sinks as desired. Additionally, the size and shape of the wires 46 could vary considerably from that illustrated and described herein.

Although certain embodiments have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A sink protector comprising:
   a frame defining a frame opening;
   a grate supported by the frame, the grate including a first grate section and a second grate section, each grate section including a plurality of grate members, the grate members defining apertures extending therethrough; and at least one pair of projection members extending up from the frame and defining a gap having a width therebetween that is sized to receive a portion of the first grate section therein, the width of the gap being smaller than a width of the received portion to resist detachment of the first grate section from the frame, wherein the grate sections are pivotally connected such that the second grate section pivots about the first grate section from a closed position whereby the first and second grate sections are substantially coplanar to an open position whereby the second grate section pivots with respect to the first grate section to expose a portion of the frame opening.

2. The sink protector as recited in claim 1, wherein each of the first and second grate sections defines a perimeter supporting the plurality of grate members.

3. The sink protector as recited in claim 2, wherein the frame includes a frame seat and a lip projecting upward from the frame seat such that the perimeter is seated on the frame seat inboard of the lip.

4. The sink protector as recited in claim 1, wherein the second grate section folds on top of the first grate section.

5. The sink protector as recited in claim 2, wherein the grate members comprise a plurality of elongate wires connected at one end to the perimeter and connected to an opposing end of the perimeter.

6. The sink protector as recited in claim 5, wherein each of the plurality of elongate wires includes a u-shaped portion disposed proximate to and connected to the opposing end of the perimeter.

7. A sink protector comprising:
a frame defining a frame opening;
a grate supported by the frame, the grate including a first grate section and a second grate section each including a plurality of grate members defining apertures extending therethrough,
wherein the first and second grate sections are pivotally connected such that at least one of the first and second grate sections pivots about the other of the first and second grate sections from a closed position whereby the first and second grate sections are substantially coplanar to an open position whereby the at least one grate section pivots with respect to the other grate section to expose a portion of the frame opening,
wherein each of the first and second grate sections defines a perimeter supporting the plurality of grate members,
wherein the grate members comprise a plurality of elongate wires connected at one end to the perimeter and connected to an opposing end of the perimeter,
wherein each of the plurality of elongate wires includes a u-shaped portion disposed proximate to and connected to the opposing end of the perimeter, and
wherein a first plurality of the elongate wires have u-shaped portions defined by a first radius, and a second plurality of the elongate wires have u-shaped portions defined by a second radius, wherein the first radius being smaller than the second radius, and wherein the first and second plurality of elongate wires alternate across the grate.

8. The sink protector as recited in claim 6, wherein the u-shaped portions extend outboard of the opposing end of the perimeter.

9. The sink protector as recited in claim 8, wherein the frame includes a frame seat, a lip projecting upward from the frame seat, and a flange extending out from the lip a distance greater than a distance that the u-shaped portions extend outboard of the perimeter.

10. The sink protector as recited in claim 1, wherein each of the first and second grate sections comprises approximately one-half of the grate.

11. The sink protector as recited in claim 1, wherein the second grate section is positioned so as to be in vertical alignment with a sink drain when in the closed position.

12. The sink protector as recited in claim 1, wherein the grate covers less than half the surface area of the frame opening when the second grate section is in the closed position.

13. A sink protector comprising:
a frame defining a frame opening;
a grate supported by the frame, the grate including a first grate section and a second grate section each including a plurality of grate members defining apertures extending therethrough,
wherein the first and second grate sections are pivotally connected such that at least one of the first and second grate sections pivots about the other of the first and second grate sections from a closed position whereby the first and second grate sections are substantially coplanar to an open position whereby the at least one grate section pivots with respect to the other grate section to expose a portion of the frame opening, and
wherein the frame has a plurality of feet projecting down from the frame and out of alignment with the grate members, such that a plurality of the sink protectors can be stacked on top of each other in a stack, wherein the stack has a height less than the cumulative height of the plurality of sink protectors if not stacked.

14. A sink protector comprising:
a frame defining a frame opening, the frame including a horizontal seat, a vertical lip projecting up from the horizontal seat, a flange extending horizontally from an upper end of the lip, and at least one pair of projection members extending up from the horizontal seat;
a grate supported by the seat of the frame, the grate including a first grate section and a second grate section, wherein the first grate section is retained between the projection members, and the second grate section rests on the frame seat, each of the first and second grate sections including a plurality of grate members defining apertures extending therethrough,
wherein the second grate section is pivotally connected to the first grate section and movable between a closed position, whereby the second grate section is substantially coplanar with the first grate section, and an open position, whereby the second grate section is pivoted away from the closed position, and
wherein the frame has a plurality of feet projecting down from the frame and out of alignment with the grate members, such that a plurality of the sink protectors can be stacked on top of each other in a stack, wherein the stack has a height less than the cumulative height of the plurality of sink protectors if not stacked.

* * * * *